United States Patent [19]

Lauven

[11] 4,314,488

[45] Feb. 9, 1982

[54] HYDRAULIC CONTROL VALVE SYSTEM WITH A PRESSURE REGULATOR FOR A PLANETARY GEAR TRANSMISSION

[75] Inventor: Walter Lauven, Wohnpark, Fed. Rep. of Germany

[73] Assignee: Ford Motor Company, Dearborn, Mich.

[21] Appl. No.: 75,456

[22] Filed: Sep. 14, 1979

[30] Foreign Application Priority Data

Sep. 23, 1978 [DE] Fed. Rep. of Germany ....... 2841526

[51] Int. Cl.³ .................... B60K 41/04; B60K 41/06
[52] U.S. Cl. .................................... 74/869; 74/867; 74/868; 74/752 C
[58] Field of Search ............... 74/867, 863, 864, 868, 74/869, 752 C

[56] References Cited

U.S. PATENT DOCUMENTS

| | | | |
|---|---|---|---|
| 3,369,430 | 2/1968 | Haley | 74/869 X |
| 3,393,585 | 7/1968 | Pierce, Jr. | 74/864 |
| 3,453,908 | 7/1969 | Iijima | 74/869 X |
| 3,505,906 | 4/1970 | Lemieux | 74/869 X |
| 3,651,714 | 3/1972 | Ohya et al. | 74/867 |
| 3,683,721 | 8/1972 | Vozumi et al. | 74/869 |
| 3,709,066 | 1/1973 | Burcz | 74/869 X |
| 3,714,836 | 2/1973 | Pierce et al. | 74/869 X |
| 3,744,348 | 7/1973 | Lemon | 74/869 |
| 3,938,410 | 2/1976 | Dach et al. | 74/869 |
| 3,949,627 | 4/1976 | Murakami | 74/867 |

FOREIGN PATENT DOCUMENTS 47-687 5/1972 Japan .................................... 74/869

Primary Examiner—Leslie Braun
Assistant Examiner—L. Gotts
Attorney, Agent, or Firm—Frank G. McKenzie; Donald J. Harrington

[57] ABSTRACT

An automatic control valve system for a multiple ratio power transmission mechanism for an automotive vehicle wherein the mechanism comprises multiple gear elements, the motion of which is controlled by selectively engageable clutches and brakes, a pressure source driven by a power input element of the transmission, a valve circuit for distributing pressure from said source to the clutches and brakes to establish a shift sequence, a pressure regulator valve that is responsive to engine intake manifold pressure and to speed whereby an increase in engine throttle setting will result in an increase in circuit pressure in the control valve system, and a throttle pressure cut-out valve that interrupts distribution of engine intake manifold pressure signals to the pressure regulator valve during operation of the mechanism in the highest speed range thereby preventing an excessive pressure in the control valve system while retaining an adequate residual pressure to maintain clutch and brake engagement during high speed ratio operation.

3 Claims, 4 Drawing Figures

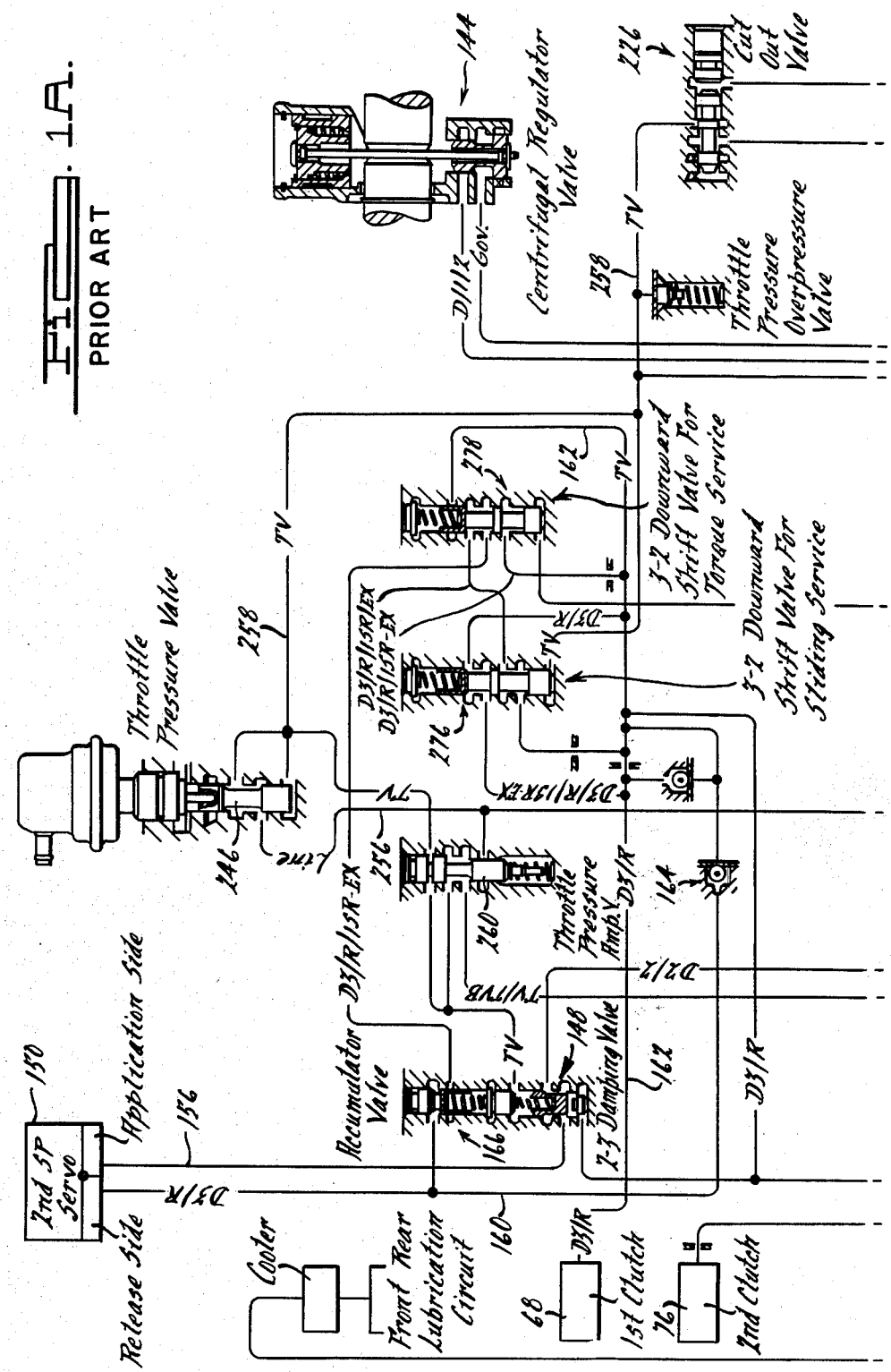

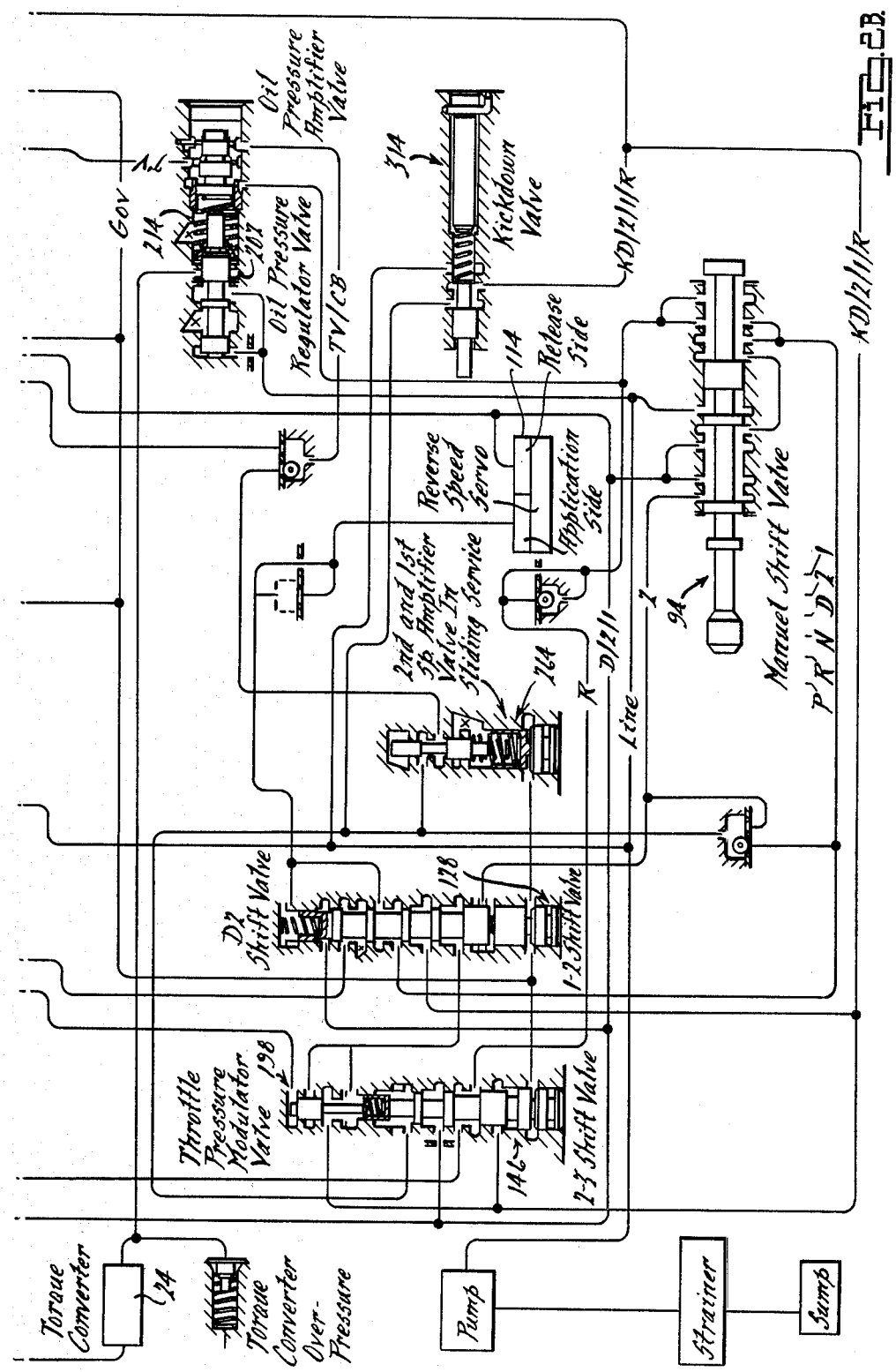

HYDRAULIC CONTROL VALVE SYSTEM WITH A PRESSURE REGULATOR FOR A PLANETARY GEAR TRANSMISSION

GENERAL DESCRIPTION OF THE INVENTION

My invention comprises improvements in a control valve circuit such as that shown in U.S. Pat. No. 3,714,836, which describes a control valve circuit for a multiple ratio transmission. The circuit of that patent includes a pressure regulator valve and an oil pressure booster that forms a part of the pressure regulator valve. The booster is subjected to a torque signal from a transmission throttle valve and to pressure from a cutback valve which responds to governor pressure so that a reduction in the regulated oil pressure occurs when the transmission is operated at a high enough speed to cause the cutback valve to operate.

The pressure regulator valve of U.S. Pat. No. 3,714,836 supplies regulated pressure to the valve circuit thereby causing clutch and brake engagement and release during a shift pattern for the multiple ratio gearing. Other examples of the prior art where a cutback valve is used to change the regulated pressure level of the control valve circuit pressure regulator is that described in U.S. Pat. No. 3,393,985. The cutback control valve shown in FIG. 2A at 384 of that patent performs a cutback function.

Another example similar to the cutback valve of U.S. Pat. No. 3,714,836 is shown in U.S. Pat. No. 3,505,906, especially in FIG. 2A of that patent.

The improvement of the present invention includes a cutout valve that responds to development of pressure in the high speed ratio clutch for the transmission so that distribution of a torque signal to the pressure regulator valve is interrupted thereby preventing increases in the circuit pressure level when the transmission is operated in the high speed range. As the engine torque is increased, the normal threshold pressure level maintained by the pressure regulator valve is sufficient to maintain clutch and brake engagement during high speed ratio operation without the necessity for causing a further pressure increase in response to an increase in engine torque. This improvement reduces the energy required to drive the pump and improves the overall efficiency of the transmission mechanism because of the lower parasitic power loss required to drive the pump. An increase in line pressure is not required during high speed ratio to maintain the clutches and brakes in engagement.

Upon a downshift to the second or third speed ratio, the load sensitive pressure level is immediately restored. For purposes of this specification the improvement dealing with the cutoff valve may be considered independently of the other functions of the control valve system of U.S. Pat. No. 3,714,836. For that reason a detailed description of the reference patent will not be made although the drawings in this application identify those components of the valve system that have counterpart components in the valve system of U.S. Pat. No. 3,714,836. The entire disclosure of U.S. Pat. No. 3,714,836 is incorporated herein by reference.

BRIEF DESCRIPTION OF THE FIGURES OF THE DRAWINGS

FIG. 1A and FIG. 1B show a schematic illustration of the known hydraulic control system in which the various valves are provided with their corresponding designations, to which the reference numerals with which said valves are designated in U.S. Pat. No. 3,714,836 are added. Letter and numeral insertions are provided in the various lines, which indicate in what service state each line carries pressure and what pressure it carries.

FIG. 2A and FIG. 2B show a schematic view of the hydraulic control valve system according to the invention, whilst the sub-system to which the invention relates is shown emphasized. Here again the known valves are provided with their corresponding designations and with reference numerals added whereas the novel valves are shown emphasized and provided with additional free reference numerals for detailed explanation.

PARTICULAR DESCRIPTION OF THE INVENTION

Figure 1B:
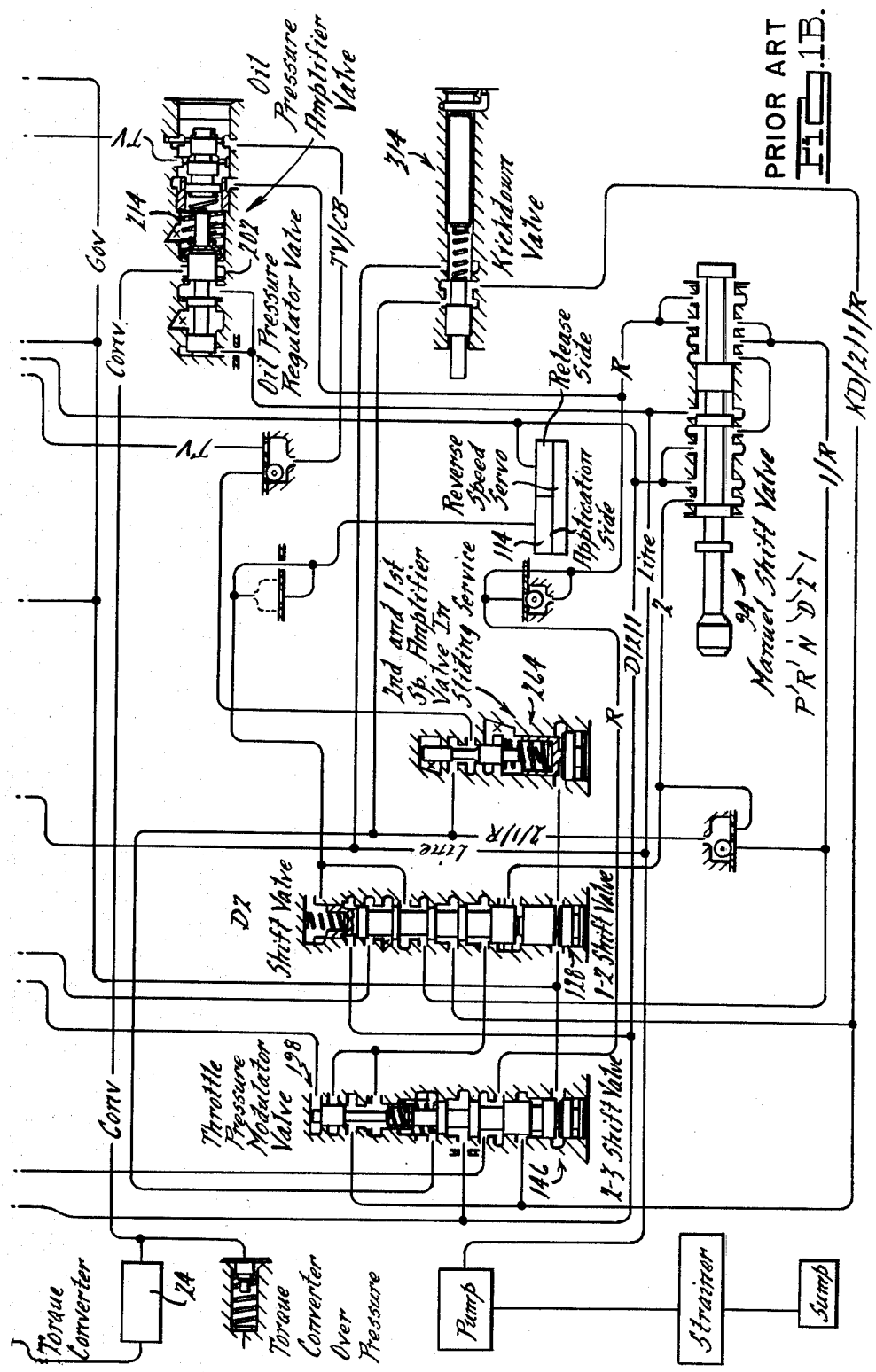

The FIGS. 1A and 1B show the known hydraulic control valve system for an epicyclic change-speed gearbox for a motor vehicle, the mode of function of which has been explained in all details in U.S. Pat. No. 3,714,836 and which, therefore, does not require to be repeated in its full extent here, but is only explained insofar as the hydraulic control valve relevant to the invention is considered.

Figure 2A:
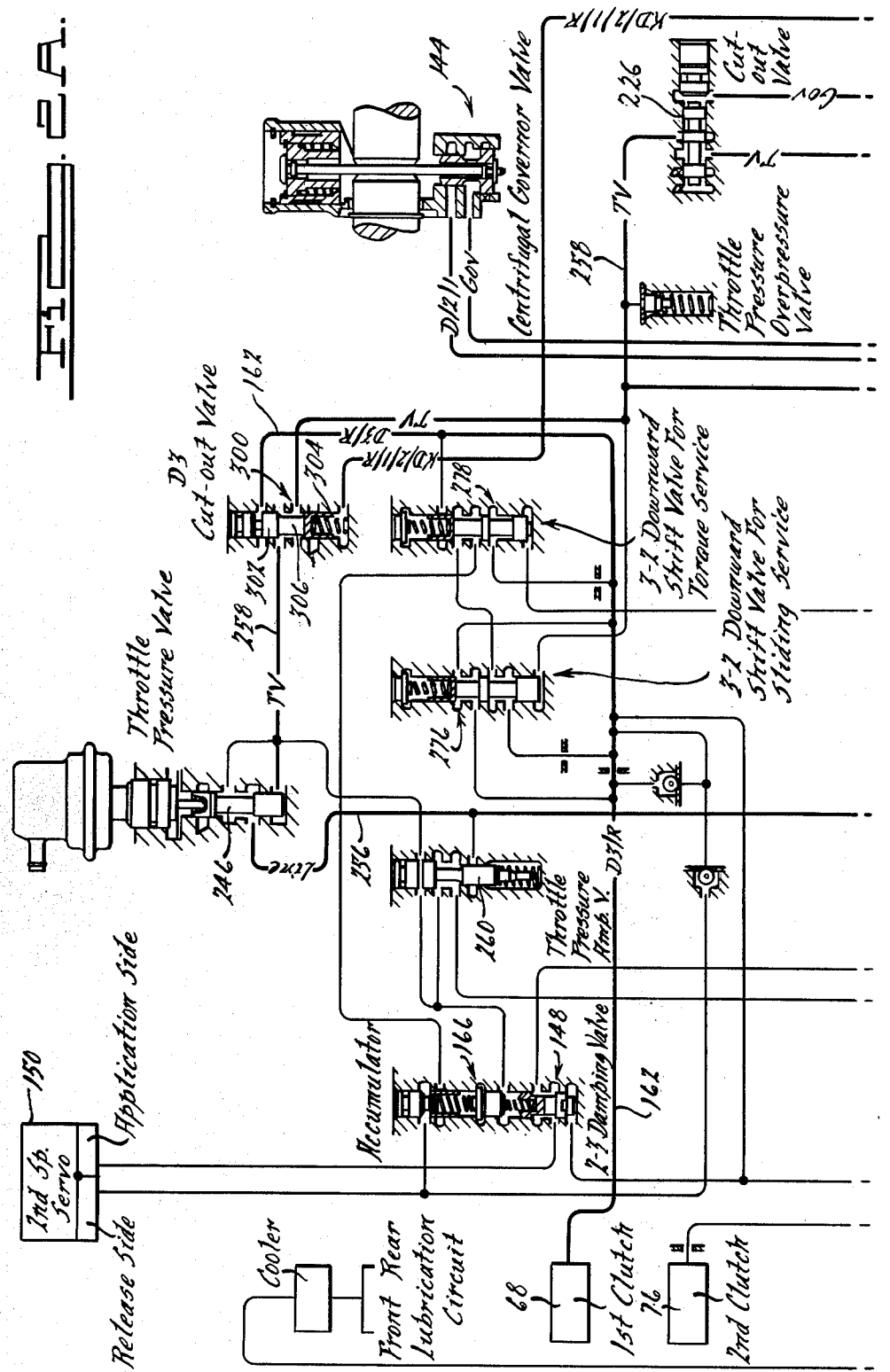

In FIGS. 2A and 2B the hydraulic control valve system to which the invention relates is shown emphasized. This includes the oil pressure regulator valve 202 with the oil pressure amplifier valve 214 and with the throttle pressure valve 246 influencing the latter and the related cut-out valve 226.

As has already been mentioned initially, the cut-out valve 226 is only in a position to cancel the influence of the throttle pressure (TV) upon the oil pressure amplifier valve 214 if the centrifugal governor pressure (GOV) exceeds the throttle pressure (TV). It has now been discovered that according to this known control system there occurs even after the upward shifting of the gearbox into the third speed an increase in the line pressure which is in no way necessary for holding the clutches and brakes engaged during the shift operation into the third speed and represents only a power loss which reduces the efficiency of the automatic transmission.

In order to avoid this disadvantage, a D3 cut-out valve 300 which is constituted by a valve body 302 and a valve spring 304 is inserted into the throttle pressure line 258 leading to the cut-out valve 226. In this case the signal pressure D3/R acts upon the end of the valve element 302 opposite the valve spring 304, whereas the signal pressure KD/2/1/R influences the end near the spring. The throttle pressure line 258 runs through a median section 306.

Whilst retaining the load-dependent regulation process of the line pressure in the first and second speeds, in the case of an upward shift into the third speed, due to the signal pressure D3 influencing the D3 cut-out valve 300, a blocking of the throttle pressure TV occurs, which, therefore, no longer reaches the oil pressure amplifier valve 214 and thus can no longer cause a pressure increase. The pressure level then present is sufficient to hold the closed clutches. The oil pump of the transmission thus delivers counter to a lower pressure level and accordingly absorbs correspondingly less power. In the case of a positive shift down into the second or first speed by kickdown or manual shift to "2" or "1", the former load-dependent pressure level is immediately restored because the D3 cut-out valve 300 is moved by the signal pressure KD/2/1/R acting in the direction of the valve spring 304 in such a way that the transmission of the throttle pressure TV to the oil pressure amplifier valve 214 is re-established.

The centrifugal governor pressure (GOV) could also be utilized to actuate the D3 cut-out valve 300 in this case. In this case the valve would have to be adapted in its operating characteristic to the two-three shift valve.

When the 2-3 shift valve 146 moves to the upshift position, a pressure signal D3/R is communicated from shift valve 146 to the high speed ratio clutch 68. The D3/R pressure signal is also transmitted by hydraulic line 162 to the cut-out valve 300, which then operates to close off communication between the throttle pressure valve 246 and the oil pressure amplifier valve 214.

Obviously, still further forms of actuation are conceivable in order to achieve the same effect, the elimination of the influence of the throttle pressure upon the oil pressure amplifier valve in the case of upward shifting into the third speed.

Having described a preferred form of the invention, what is claimed is:

1. A hydraulic control valve system for an epicyclic change-speed gearbox for a motor vehicle comprising a planetary gear train having gear elements that are relatively movable, one with respect to the other, to establish speed ratios, clutches and brakes for controlling the relative motion of said gear elements, a high speed ratio clutch means for effecting a one to one driving condition through said gearbox, a reaction brake adapted to anchor a reaction gear element of said gearbox to establish an underdrive condition, clutch and brake servos for actuating said clutches and brakes, a pressure source comprising a pump driven by a power input element of said gearbox, a control valve circuit connecting said pump to said clutch and brake servos, a pressure regulator valve in said valve system including a pressure amplifier valve, a source of a torque signal that responds to torque input to said gearbox, a source of a speed signal that is proportional in magnitude to the driven speed of a driven member of said gearbox, said amplifier valve being subjected to said signals and a cut-out valve means in said valve system for interrupting communication between said amplifier valve and said torque signal source thereby preventing the transmission of said torque signal to the oil pressure amplifier valve as soon as an upshift into the high speed ratio condition occurs.

2. The combination as set forth in claim 1 wherein said cut-out valve is adapted to be subjected to the pressure made available to said high speed ratio clutch whereby it is shifted to a torque signal interrupting position upon application of said high speed ratio clutch.

3. The combination as set forth in claim 1 wherein said control valve system includes a shift valve adapted to distribute selectively pressure to a clutch for a direct drive condition and a brake for an underdrive condition, said shift valve being subjected to said pressure signals, said shift valve being part of said cut-out valve means and being in communication with said amplifier valve whereby distribution of a torque signal through said cut-out valve means to said amplifier valve is interrupted when said shift valve is in an upshift position.

* * * * *